US005926913A

United States Patent [19]

Hernandez et al.

[11] Patent Number: 5,926,913

[45] Date of Patent: Jul. 27, 1999

[54] PNEUMATIC TOOL EXTENSION

[76] Inventors: J. Manuel Hernandez, 880 Lester Ave., Hayward, Calif. 94545; M. Elizabeth Harbinson-Moore; Johnny L. Moore, both of 612 El Pintado Rd., Danville, Calif. 94526; Josephine Cruz Hernandez, 880 Lester Ave., Hayward, Calif. 94545

[21] Appl. No.: 08/964,887

[22] Filed: Nov. 5, 1997

[51] Int. Cl.[6] ............................ B25G 1/00; B23B 45/04; F16D 31/02

[52] U.S. Cl. .............................. 16/115; 74/544; 173/170; 30/296.1; 16/114 R

[58] Field of Search .................................. 16/114 R, 115; 81/177.2; 74/544; 30/296.1, 298; 173/170

[56] References Cited

U.S. PATENT DOCUMENTS

| | | | |
|---|---|---|---|
| 4,016,684 | 4/1977 | Urda | 51/170 R |
| 4,735,118 | 4/1988 | Broemel, Jr. | 81/57.3 |
| 4,827,809 | 5/1989 | Broemel, Jr. | 81/57.3 |
| 5,070,576 | 12/1991 | Banta | 16/114 R |
| 5,509,489 | 4/1996 | Lower, Jr. | 173/170 |
| 5,546,749 | 8/1996 | Couchee | 16/111 R |
| 5,598,892 | 2/1997 | Fox | 30/296.1 |
| 5,640,885 | 6/1997 | Spence | 16/110 R |
| 5,787,590 | 8/1998 | D'Alessandro | 16/115 |
| 5,860,216 | 1/1999 | Shellnutt | 30/296.1 |

*Primary Examiner*—Chuck Y. Mah
*Assistant Examiner*—Donald M. Gurley
*Attorney, Agent, or Firm*—Jeffrey P. Aiello; Carol D. Titus; James J. Leary

[57] ABSTRACT

An extension for use with different pneumatically powered tools is provided. The extension comprises an elongated body for coupling the extension to a pneumatic source and a sleeve for coupling a pneumatic tool to the extension, coupling the tool to the source. The extension has a small diameter to enable the extension to be disposed in substantially small workspaces, for enabling facile operation of a pneumatic tool coupled to the extension in such workspaces. The extension is sufficiently long, to enable a tool coupled to the extension to access fasteners located in deep and narrow workspaces. The body has a handle that includes a control switch for controlling activation of a tool coupled thereto, thus remotely controlling activation of the tool. A passageway extends through the body to provide an air flow path therethrough pneumatic air source to the pneumatic tool coupled to the extension. The sleeve has a connecting portion for coupling the sleeve to the body and a coupling portion for coupling the sleeve to the tool. A clamp is affixed to the coupling region of the sleeve for securing the tool to the extension. The clamp is provided for bypassing the activation switch of the tool, to enable remote activation the tool with the extension, and to secure the tool to the sleeve.

19 Claims, 3 Drawing Sheets

PNEUMATIC TOOL EXTENSION

BACKGROUND OF THE INVENTION

1. Field of the Invention

The present invention relates generally to pneumatically tools, and more particularly, to an extension for use with pneumatically powered tools.

2. Description of Related Art

Pneumatically powered, or air powered, tools are well known. Pneumatic tools provide a facile means of applying a torque force to a fastener, such as a bolt or nut, for enabling an operator of such a tool to secure the fastener. Thus, pneumatic tools are capable of applying a substantial torque force to a desired fastener, while the operator typically only steadies or braces the tool against the torque force. Therefore, these tools have found wide acceptance in a number of different mechanically based trades, such as the automotive repair industry.

Pneumatic tools typically comprise a body portion that includes a handle, and a head portion that includes drive means for retaining a socket or other similar fastener driving member. A switch for activating and deactivating a pneumatic source coupled to the tool is usually positioned along the handle of the tool. However, pneumatic tools are relatively larger than their manually controlled counterparts, due to their incorporation of pneumatic control componentry.

Pneumatic tools are particularly useful when repairing automobiles, since they are well suited for applying torque to fasteners located in small workspaces, that do not allow a sufficient range-of-motion for an operator to manually tighten the fastener. However, these small workspaces are often elongated and relatively inaccessible to even pneumatic tools, since there is not sufficient room for an operator of the tool to place their hand, and potentially arm, in the workspace and along with the tool, for controlling activation of the tool.

It therefore would be advantageous to provide a means for affording remote activation and deactivation of a pneumatic tool that enables control of the pneumatic tool in relatively inaccessible workspaces.

Devices in the prior art have been provided for enhancing the control of pneumatic tools. One such device is disclosed in U.S. Pat. No. 4,735,118, to Broemel, Jr. Disclosed therein is an air ratchet adaptor that includes a slotted semicylindrical handle that serves as a holder of a commercially available three-eighths inch drive air ratchet. The handle has an end formed into a flat, elongated, rectangular gear housing for transferring air powered torque from the air ratchet. The handle includes an aperture configured to snap fit the air ratchet therein, and a driving gear located in the aperture for coupling the ratchet to a driven gear.

The handle includes a handle insert for adapting the handle to different brands of air ratchets. The gear housing contains the driving gear, meshing idler gears, and driven gear. The driving gear includes a square aperture for mating with the square shank of the air ratchet head. The driven gear includes a hexagonal aperture for accepting internal removable sockets. The internal sockets are provided to keep required workspace to a minimum. However, a disadvantage of the disclosed air ratchet adaptor is that it is only configured for operation air driven ratchets and thus it is not adaptable for use with any other known pneumatic tools such as drills for example.

U.S. Pat. No. 4,827,809, to Broemel, Jr., discloses a compatible extension tip for an air ratchet adaptor, such as the air ratchet adaptor disclosed in U.S. Pat. No. 4,735,118, to Broemel, Jr. The extension tip includes a hollow housing that contains a driven gear and an idler gear. The extension tip may be formed in varying shapes which determine the number of idler gears, if any, needed. The tip is symmetrical for allowing reversible attachment of the air ratchet adaptor thereto.

U.S. Pat. No. 4,016,684, to Urda, is directed to a safety operating lever for hand tools. A safety lever lock is pivotally mounted to the safety lever at an end opposite to the pivotal mounting of the lever to a hand tool housing. The safely lever lock is biased in a position which prevents the operating lever from rotating. The lock is released by rotating the lock approximately 90 degrees from its locking position. In the second position, the operating lever is rotated to activate the tool. The mounting of the safety lever lock permits release of the lock and operation of the lever with one hand.

Thus, there exists a need for a pneumatic extension that affords remote control of a pneumatic tool coupled to the extension, while allowing operation of a pneumatic tool in relatively inaccessible workspaces.

OBJECTS OF THE INVENTION

It is therefore an object of the present invention to provide an extension for use with pneumatically powered tools;

It is another object of the present invention to provide an extension for use with pneumatically powered tools that is configured for operation with a number of different pneumatic tools;

It is a further object of the present invention to provide an extension for use with pneumatically powered tools that provides remote operation of a pneumatic tool; and It is still another object of the present invention to provide an extension for use with pneumatically powered tools that may be positioned in a small or limited workspace for allowing operation of pneumatically powered tools in small workspaces.

SUMMARY OF THE INVENTION

These and other objects and advantages of the present invention are achieved by providing an extension configured for use with a number of different pneumatically powered tools. The pneumatic extension of the present invention comprises an elongated cylindrical body for coupling the extension to a pneumatic source and a sleeve for coupling a pneumatic tool to the extension, thus coupling the tool to the source. The invented extension has a relatively small diameter to enable the extension to be disposed in a substantially small workspace, for enabling facile operation of a pneumatic tool coupled to the extension in the workspace. Additionally, the extension is sufficiently long, ranging from approximately 8 inches to 12 inches or more, to enable a tool coupled to the extension to access fasteners located in deep and narrow workspaces, for removing or installing the fasteners.

Particularly, the invented pneumatic tool extension comprises an elongated cylindrical body that is preferably fabricated from a lightweight, rigid, and durable material. Suitable materials include known metal alloys, such as aluminum for example, or known composite materials and strong, rigid polymeric materials. The lightweight body affords extended usage of the extension, without becoming tiresome for an operator. The body has a handle portion adjacent to a first end thereof and a second end. The handle portion may be somewhat conical in cross-sectional configuration to enhance grasping of the extension. The handle portion may additionally have a plurality of grooves formed in the periphery thereof to further enhance gripping of the extension. The handle portion includes an activation control switch for controlling activation of a pneumatic tool coupled to the extension. The activation control means is preferably positioned in the handle portion to provide one-handed control of a pneumatic tool coupled to the extension.

The body's first end is configured with an aperture provided With detachable retaining means for detachably coupling the extension to a pneumatic source, via a known air hose. The retaining means, which may comprise either one of a male and female portion of a quick-disconnect fitting, is provided for positively coupling the air hose to the body, to prevent the air source from inadvertently detaching from the extension. The body's second end is also configured with an aperture provided with means for detachably coupling the extension to a desired pneumatic tool, such as an air driven ratchet for example. The retaining means may again comprise a known quick-disconnect fitting, for detachably coupling the tool to the body.

A passageway extends through the body between the apertures in the first and second ends thereof, for providing an air flow path from the pneumatic air source to the pneumatic tool coupled to the extension. The pneumatic activation control means is actuated for opening and closing the passageway for controlling air flow therethrough, thus remotely controlling activation of the pneumatic tool.

The sleeve is provided for coupling a pneumatic tool to the extension, and thus coupling the tool to the air source. The sleeve comprises a hollow cylindrical member having a connecting portion configured complementary to a connecting region of the body, for slidably coupling the sleeve to the body. The sleeve further includes a coupling portion that is configured for mating to the handle of a desired pneumatic tool, or to any other suitable location of the tool, for securely coupling the tool to the invented extension. The coupling region is preferably semicylindrical in cross-sectional configuration, but may be other configurations, depending upon the shape of the desired tool to be coupled to the extension. A detachable securing means is affixed to the coupling region of the sleeve for securing a pneumatic tool to the extension. The securing means is provided for bypassing the pneumatic activation switch of the tool, to enable remote activation the tool with the extension, and to secure the tool to the sleeve.

Positioning means are provided for maintaining the sleeve at different desired locations along the connecting region of the body. The positioning means may comprise a spring biased member, such as a small pin, that projects slightly above the periphery of the body at a selected position in the connecting region. A plurality of holes, dimensioned complementary to the projecting member, are formed through the coupling portion of the sleeve for receiving the member. The holes are spatially positioned along the sleeve, for positioning the sleeve at different selected locations along the body's connecting region.

In use, an operator depresses the projecting member so that the sleeve can be slid over the member and along the body's connecting region. The sleeve is slid along the connecting region until a hole aligns with the projecting member. The spring biases the projecting member into the hole for engaging the sleeve, to prevent movement between the sleeve and body. If it is desired to move the sleeve to another location along the connecting region, the projecting member is again depressed to disengage the member from the sleeve. The sleeve is then slid along the connecting region until the projecting member engages another hole in the sleeve as discussed, to prevent undesired movement between the sleeve and body.

A desired pneumatic tool is coupled to the pneumatic extension of the present invention, by first sliding the sleeve toward the first end of the body along the connecting region thereof, to allow access to the second end of the body. The pneumatic tool is provided with a selected one of a male and female portion of a quick-disconnect fitting, while the aperture in the second end of the body is provided with the complementary portion of the quick-disconnect fitting. The tool is then disposed into the aperture and the quick-disconnect fittings are interconnected for coupling the tool to the extension. The sleeve is then slid toward the second end of the body and upwardly along the tool until the securing means thereof is substantially aligned with the pneumatic activation switch of the tool and the positioning means causes the body to engage the sleeve. The securing means, which may comprise a clamp for example, is then disposed about the activation switch of the tool and secured to each side of the connecting region to depress the switch for bypassing the switch.

A pneumatic source is coupled to the extension, via a pneumatic hose which is provided with a selected one of a male and female portion of a quick-disconnect fitting. The aperture in the body's first end is provided with a complementary portion of the quick-disconnect fitting to allow the fittings to interconnect for coupling the hose to the body, thus positively coupling the air source to the extension. The air source is then activated as is known. The activation control switch in the body's handle portion is then actuated for controlling air flow through the passageway to control activation of the pneumatic tool. Thus, remote operation of the pneumatic tool is enabled for allowing operation of the tool in relatively inaccessible workspaces.

When it is desired to couple a different pneumatic tool to the invented extension, the hose is disconnected from the quick-disconnect fitting in the first end of the body. The positioning means is then actuated to release the sleeve from the body. The sleeve is then slid toward the first end of the body until the tool's handle is exposed and the quick-disconnect fitting located in the body's second end is accessible. The tool is then disconnected from the fitting as is known. Another pneumatic tool may then be coupled to the body as discussed above.

BRIEF DESCRIPTION OF THE DRAWINGS

The objects and features of the invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Figure 1:
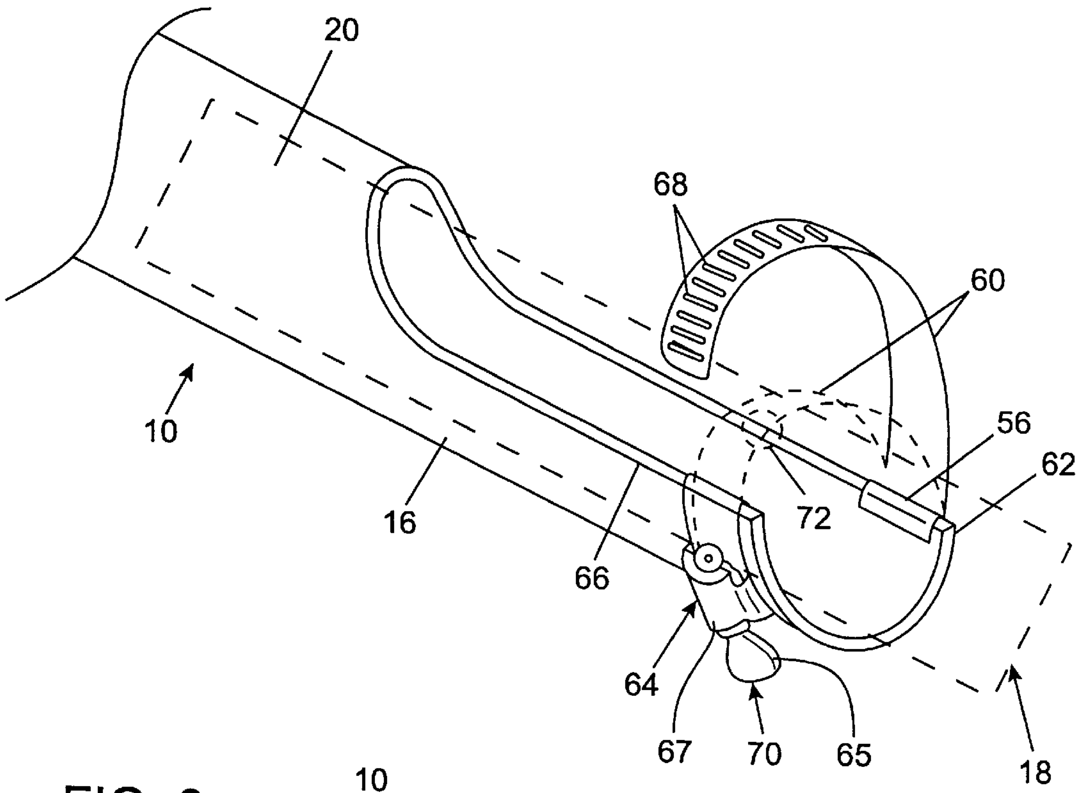
FIG. 1 is fragmentary view showing a preferred embodiment of an extension configured for use with a number of different pneumatically powered tools of the present invention.
Figure 6:
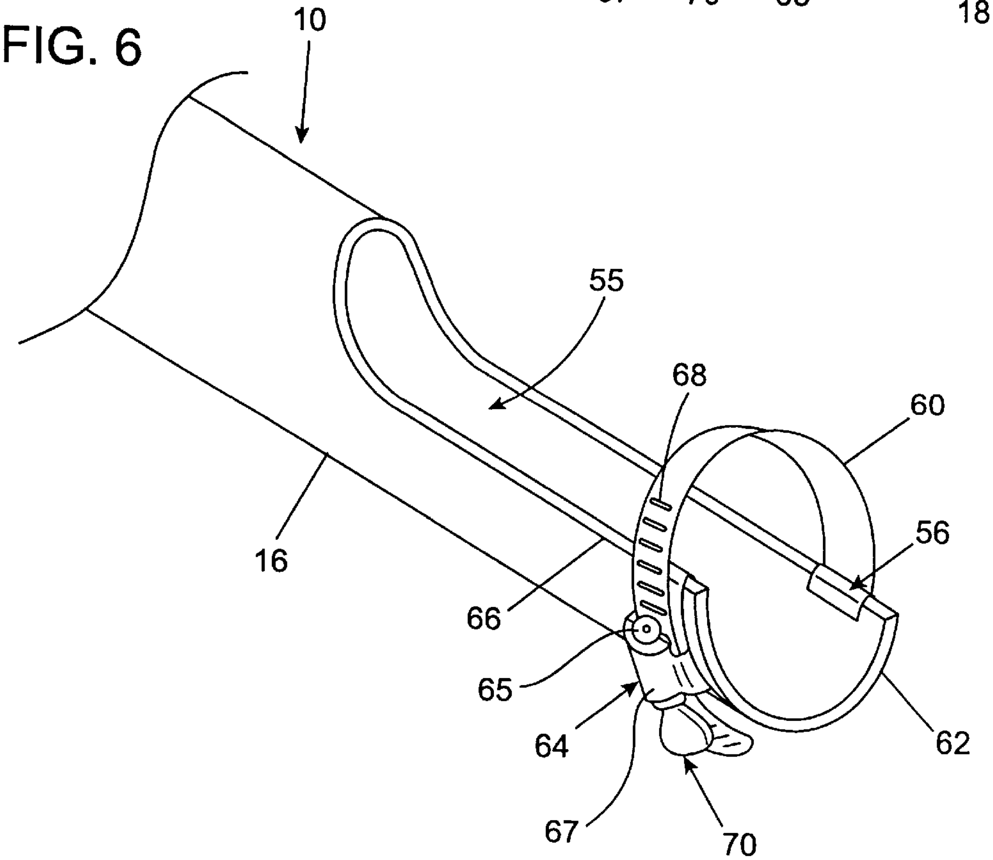
FIG. 6 is a perspective, fragmentary view showing the sleeve of the preferred embodiment of the present invention.

The following description is provided to enable any person skilled in the art to make and use the invention and sets forth the best modes to presently contemplated by the inventors of carrying out their invention. Various modifications, however, will remain readily apparent to those skilled in the art, since the generic principles of the present invention have been defined herein.

Referring now to the drawing Figures, there is shown generally at 10, a preferred embodiment of an extension configured for use with a number of different pneumatically powered tools. The pneumatic extension 10 of the present invention includes an elongated cylindrical body 12 for coupling the extension 10 to a pneumatic source 14, such as an air hose 14 coupled to an air compressor 15. The pneumatic extension 10 further includes a sleeve 16 for coupling a pneumatic tool 18 (shown in phantom in FIG. 12) to the extension, thus coupling the tool 18 to the air source 14. The extension 10 is preferably fabricated from a lightweight, rigid, and durable material or compositions of known materials. Suitable materials include known metal alloys, such as aluminum for example, or known composite materials and strong, rigid polymeric materials. In the preferred embodiment, the invented extension 10 is fabricated from a suitable commercial grade aluminum alloy, as is fabricated using methods well known in the art.

The invented extension 10 is dimensioned with a relatively small diameter to enable the extension 10 to be disposed in a substantially small workspace, for enabling facile operation of the pneumatic tool 18 coupled to the extension 10 in the workspace. Preferably, the diameter of the extension, and particularly the sleeve 16, is just sufficiently large to receive a handle 20 of the pneumatic tool 18, which may comprise a pneumatic drill, ratchet, or other well known pneumatic tool, to secure the tool 18 to the extension 10, while still enabling the tool 18 to access relatively inaccessible workspaces. The sleeve 16 is preferably approximately 1¾ inches in diameter, but the diameter of the sleeve 16 may vary greatly to accommodate different tools 18. In the preferred embodiment, the sleeve 16, along with the body 12, is semicylindrical in cross-sectional configuration, but may have any suitable cross-sectional configuration that is designed for mating to the handle 20 of the tool 18, for securing the tool 18 to the extension 10.

Figure 2:
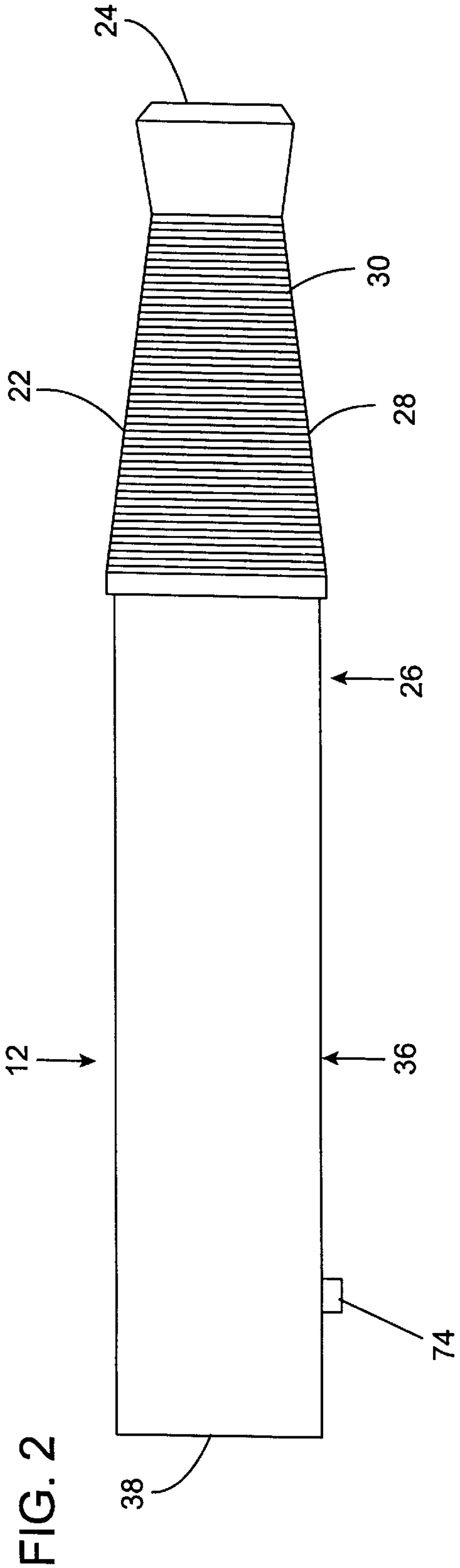
FIG. 2 is a side elevational view showing a body of the extension of the preferred embodiment.
Figure 3:
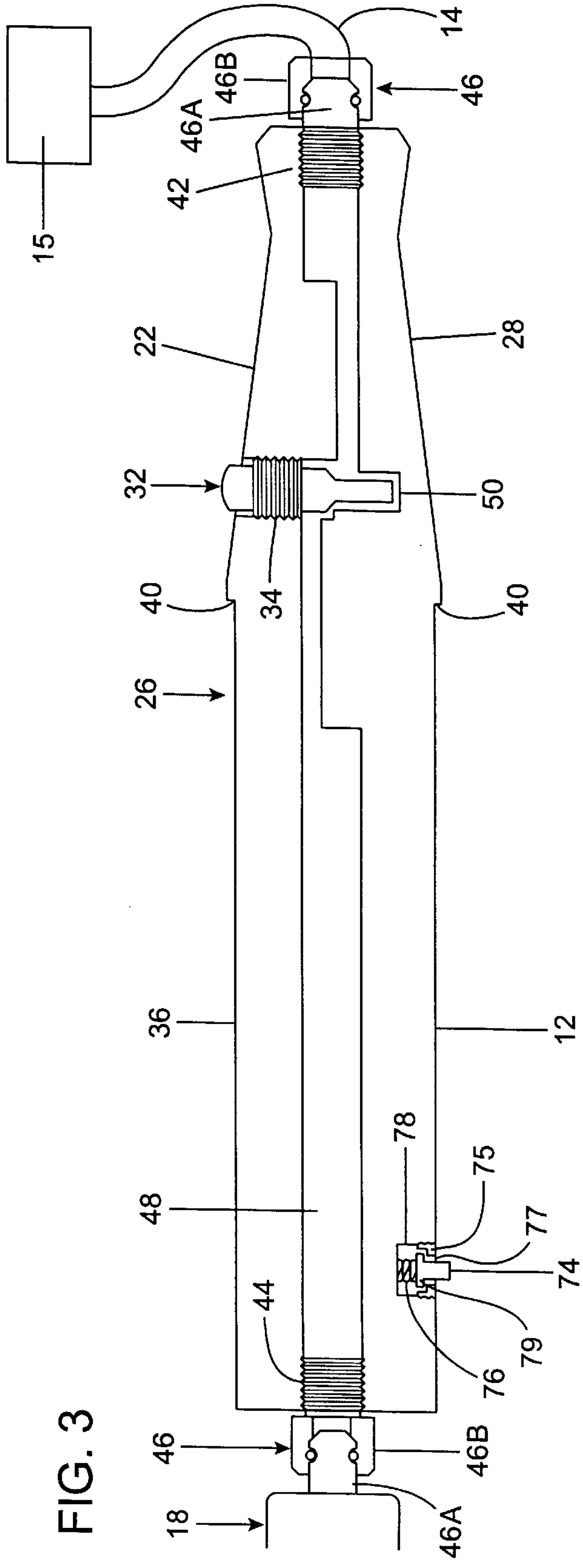
FIG. 3 is a cross-sectional view of the body of the present invention.
Figure 4:
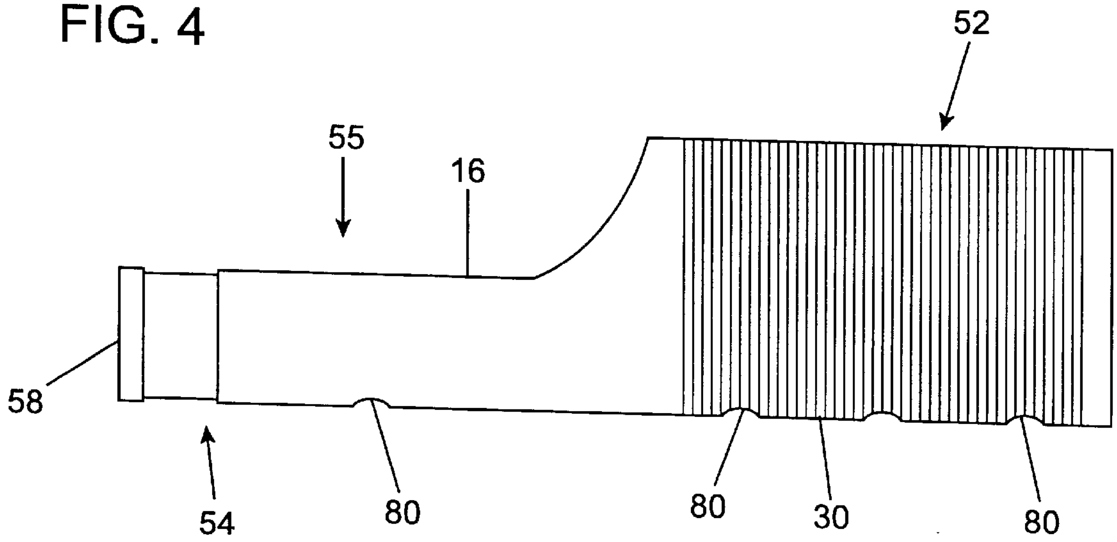
FIG. 4 is a side elevational view showing a sleeve of the extension of the preferred embodiment.
Figure 5:
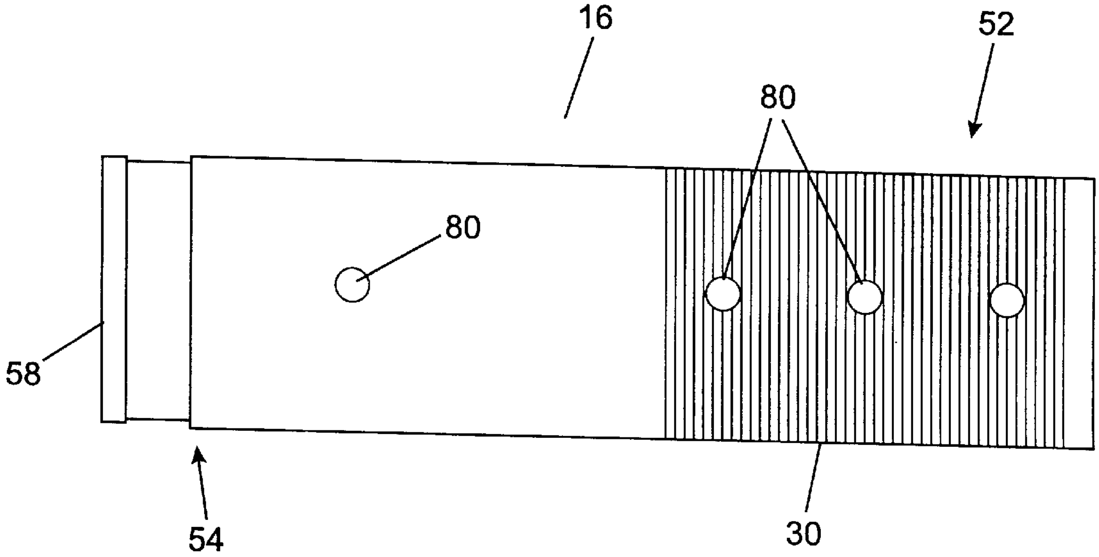
FIG. 5 is a bottom plan view of the sleeve of the present invention.

Referring now to FIG. 2 and FIG. 3 of the drawings, the body 12 of the invented pneumatic tool extension 10 comprises an elongated body member that is generally cylindrical in cross-sectional configuration. The body 12 is preferably cylindrical to enhance grasping of the body and for mating to the sleeve 16, and thus the tool 18, and for affording access to relatively inaccessible workspaces. The lightweight of the body 12 and thus the invented extension 10, affords extended usage of the extension 10 without becoming tiresome for an operator and provides facile control of the extension 10.

The body 12 includes a handle region 22 that extends from a first end 24 of the body 12 toward a midpoint 26 of the body 12. The handle 22 includes somewhat conical grasping region 28 that is provided to enhance grasping of the extension 10. Optionally, the conical grasping region 28 may have a plurality of grooves 30 that extend generally perpendicularly to the length of the body 12. The grooves 30 are formed in the conical grasping region 28 to further enhance gripping of the extension 10.

The handle 22 also preferably includes an activation control means 32 for controlling activation of the pneumatic tool 18 coupled to the extension 10. The activation control means 32 preferably comprises a momentary switch 32, such as a push button, toggle, or push and hold switch, that is positioned in the handle region 22 to provide one-handed control of the pneumatic tool 18 coupled to the extension 10. The switch 32 is retained in a treaded aperture 34 that is provided to facilitate replacement of the switch 32, if the switch 32 becomes worn or if it is desired to exchange the switch 32 with another differently configured switch.

The body 12 further comprises a connecting region 36 that extends from a second end 38 thereof toward the first end 24, and slightly beyond the midpoint 26. The periphery of the connecting region 36 is configured complementary to the sleeve 16 and is of a slightly smaller diameter thereof, to allow slidable communication therebetween, for slidably coupling the sleeve 16 to the body 12, for coupling the tool 18 to the extension 10. The connecting region 36 is sufficiently long to enable the sleeve 16 to fully reside on the extension 10 to allow access to the second end 38 thereof. In the preferred embodiment, the connecting region 36 is approximately 7½ inches long, but may be different selected lengths depending upon the length of the tool 18, the length of the sleeve 16, and the desired length of the body 12, for example. The smaller diameter of the connecting region 36 causes a shoulder 40 to be formed about a junction of the handle 22 and connecting region 36. The shoulder 40 prevents the sleeve 16 from inadvertently extending over the handle 22.

The invented extension 10 may be of any desired length that is sufficient to enable a tool 18 coupled to the extension 10 to access fasteners located in deep and narrow workspaces. In the preferred embodiment, the body 12 is approximately 12 inches in length, while the sleeve 16 is approximately 8⅞ inches in length. However, the length of the body 12 and sleeve 16 may be altered greatly to accommodate a number of different pneumatic tools used in a wide variety of applications. For example, the total length of the extension may range from approximately 4 inches to approximately 24 inches in length, depending upon the factors previously discussed.

Referring still to FIG. 2 and FIG. 3 of the drawings, each of the body's first and second ends 24, 38 are configured with a threaded aperture 42, 44 for detachably coupling the extension 10 to the air hose 14. The apertures 42, 44 are threaded for threadably securing a desired one of a male 46A or female 46B portion of a pneumatic quick-disconnect fitting 46 to the aperture 42, 44, and thus the extension 10. The male 46A or female 46B portion of the fitting 46 is selected upon the complementary portion of the fitting 46 coupled to the hose 14 or to the tool 18, for example. For example, if the hose 14 is provided with the female portion 46B of the fitting 46, then the aperture 42 formed in the body's first end 24 is provided with the male portion 46A of the fitting 46 to allow the fittings to interconnect, for detachably coupling the extension 10 to the hose 14, and to the source 15.

A passageway 48 extends the length of the body 12 and between the apertures 42, 44 in the first and second ends 24, 38 thereof. The passageway 48 provides an air flow path from the hose 14 to the pneumatic tool 18 coupled to the extension 10. An elongated cavity 50 extends through the passageway 48 and generally perpendicularly thereto. The cavity 50 terminates in the treaded aperture 34 to allow the momentary switch 32 to extend into the cavity 50 and through the passageway 48, for temporarily opening or closing the passageway 48, depending upon the desired configuration of the switch 32. Therefore, when the switch 32 is actuated, depending upon the desired configuration of the switch 32, the passageway 48 may either be opened or closed for controlling air flow therethrough, thus remotely controlling activation of any pneumatic tool 18 coupled to the extension 10.

Referring to FIGS. 2–6, the sleeve 16 comprises a hollow cylindrical member having a connecting portion 52 configured complementary to the body's connecting region 36, for slidably coupling the sleeve 16 to the body 12. The sleeve 16 further includes a coupling portion 54 that is configured for mating to the handle 20 of the desired pneumatic tool 18, or to any other suitable location of the tool 18, for securely coupling the tool 18 to the extension 10. The connecting portion 52 may be approximately 3½ inches in length and may be configured with grooves 30 to enhance gripping of the sleeve 16. The coupling portion 54 may be semicylindrical in cross-sectional configuration to form a trough 55 for receiving the tool's handle 20, but may be other configurations, depending upon the shape of the desired portion of the tool 18 to be coupled to the extension 10. The length of the coupling portion 54 may vary, again depending upon the length of the handle 20 for example.

A detachable securing means 56 is affixed to the sleeve's coupling region 54 adjacent to a front end 58 thereof for securing the pneumatic tool 18 to the extension 10. The securing means 56 preferably comprises a pliable band 60 that is secured to a side 62 of the coupling region 54 and a retaining means 64 secured to another side 66 of the coupling region 54 and opposite to the band 60. The band 60 may comprise a lightweight, and somewhat pliable metal alloy, such as steel or aluminum, or may comprise any other suitable material. The retaining means 64 may comprise any suitable mechanism that is capable of either increasing or reducing the length of the band 60. In the preferred embodiment, the retaining means 64 comprises a thumb actuated screw 65 rotatably retained in a housing 67, so that the screw 65 acts as a worm gear for adjusting the length of the band 60. The band 60 is provided with openings 68 that are engaged by threads of the screw 65, for adjusting the length of the band 60.

The band 60 is of sufficient length to be disposed about the handle 20 of the tool 18 and over an actuation switch 72 of the tool 18. Once the band 60 is disposed beneath the housing 67, the screw 65 is rotated in the housing 67 to reduce the length of the band 60, so that the band 60 exerts sufficient force on the actuation switch 72, to bias the switch 72 into an on position for bypassing the switch 72. Thus, the tool's actuation switch 72 is bypassed to effect remote activation the tool 18 with the extension 10.

Positioning means are provided for maintaining the sleeve 16 at different desired locations along the connecting region 36 of the body 12. The positioning means may comprise a spring biased member, such as a ¼ inch pin 74 that is secured to a spring 76 retained in a threaded opening 78 in the periphery of the connecting region 36. An annular threaded member 75, such as a known threaded washer or other well known annular member, is threaded into the opening 78. The annular member 75 has an aperture 77 disposed therethrough that is dimensioned to allow the pin 74 to extend through the member 75, and is sufficiently small to prevent a flange 79 of the pin 74 from passing therethrough. The annular member 75 is threaded to facilitate replacement of the pin 74, if the pin 74 becomes worn, for example.

The spring 76 biases the pin 74 outwardly from the opening 78, so that the pin 74 projects slightly above the periphery of the connecting region 36. A plurality of holes 80, that are dimensioned complementary to the pin 74, are formed through the connecting portion 52 and through the coupling region 54 of the sleeve 16 for receiving the pin 74. The holes 80 are spatially positioned along the sleeve 16, for positioning of the sleeve 16 at different selected locations along the body's connecting region 36 and for aligning the band 60 with the actuation switch 72 of the tool 18.

In use, an operator depresses the pin 74 so that the sleeve 16 can be slid over the pin 74 and along the body's connecting region 36. The sleeve 16 is slid along the connecting region 36 until a hole 80 aligns with the pin 74. The spring 76 biases the pin 74 into the hole 80 for engaging the sleeve 16, to prevent relative movement between the sleeve 16 and body 12. If it is desired to move the sleeve 16 to another location along the connecting region 36, to align the band 60 with the switch 72, the pin 74 is again depressed to disengage the pin 74 from the hole 80 in the sleeve 16. The sleeve 16 is then slid along the connecting region 36 until the pin 74 engages another hole 80 in the sleeve as discussed, to prevent undesired relative movement between the sleeve 16 and body 12.

A desired pneumatic tool 18 is coupled to the pneumatic extension of the present invention 10, by first sliding the sleeve 16 toward the first end 24 of the body 12 along the connecting region 36 until the sleeve 16 abuts the shoulder 40 or the body's second end 38 is exposed to allow access to the fitting 46 retained in the aperture 44 in the body's second end 38. The pneumatic fittings 46 of the tool 18 and fitting 46 retained in the aperture 44 are interconnected to couple the tool 18 to the extension 10. The sleeve 16 is then slid toward the second end 38 and upwardly over the tool's handle 20, until the band 60 is substantially aligned with the activation switch 72 of the tool 18 and the pin 74 is biased into a hole 80, causing the body 12 to engage the sleeve 16. The band 60 is then disposed about the switch 72, for bypassing the switch 72.

The pneumatic fitting 46 of the hose 14 is then coupled to the fitting 46A retained aperture 42 in the body's first end 24, to interconnect fittings for coupling the hose 14 to the body 12, thus detachably coupling the air source to the extension 10. The air source is then activated as is known. The activation control switch 32 in the body's handle portion 22 is then actuated for controlling air flow through the passageway 48 to control activation of the pneumatic tool 18. Thus, remote operation of the pneumatic tool 18 is enabled for allowing operation of the tool 18 in relatively inaccessible workspaces.

When it is desired to couple a different pneumatic tool 18 to the invented extension 10, the pneumatic fitting 46 between the hose 14 and body 12 is disconnected. The pin 74 is again depressed to release the sleeve 16 from the body 12. The sleeve 16 is then slid toward the body's midpoint 26 until the tool's handle 20 is exposed and the fitting 46 located in the body's second 38 is accessible. The tool 18 is then disconnected from the fitting 48 as is known. Another pneumatic tool 18 may then be coupled to the pneumatic tool extension 10 of the present invention by performing the steps previously discussed.

Those skilled in the art will appreciate that various adaptations and modifications of the just-described preferred embodiments can be configured without departing from the scope and spirit of the invention. Therefore, it is to be understood that, within the scope of the appended claims, invention may be practiced other than as specifically described herein.

What is claimed is:

1. An extension for use with pneumatic tools, the extension comprising:

an elongated body portion having a first end and a second end, the first end having an aperture configured for coupling the body to an air source and the second end having an aperture configured for coupling a pneumatic tool thereto, the body having a passageway extending between the first and second ends for providing an air flow path from the air source to the pneumatic tool, the body further including means for controlling the flow of air through the passageway;

a coupling assembly for coupling a pneumatic tool to the extension for coupling the tool to the air source, the coupling assembly including a connecting portion configured for coupling the assembly to the body and a coupling portion for coupling the tool to the extension, the coupling portion partially extending about a portion of the tool for coupling the tool to the extension; and means for bypassing an activation switch of the tool for enabling remote activation and deactivation of the tool with the flow control means of the extension.

2. The extension of claim 1 wherein the bypass means is configured to detachably secure the tool to the coupling portion of the coupling assembly, the securing means bypassing an activation switch of the tool for enabling remote activation the tool with the flow control means.

3. The extension of claim 1 wherein the coupling assembly is adjustable relative to the body portion for accommodating different pneumatic tools, the coupling assembly further being adjustable relative to the body portion to allow access to the aperture in the second end of the body for coupling the tool thereto.

4. The extension of claim 3 further comprising means for inhibiting inadvertent relative movement between the coupling assembly and body portion.

5. The extension of claim 1 wherein the aperture in each of the first and second ends of the body is provided with a pneumatic fitting, the pneumatic fitting in the aperture in the second end of the body provided for detachably coupling a pneumatic tool thereto and the pneumatic fitting in the aperture in the first end of the body provided for detachably coupling an air source to the extension, thus coupling the tool to the air source.

6. An extension for use with pneumatic tools, the extension comprising:

an elongated, lightweight body having a first end and a second end, the first end having an aperture with a pneumatic fitting secured therein for detachably coupling the body to an air source and the second end having an aperture with a pneumatic fitting secured therein for coupling a pneumatic tool thereto to couple the tool to the extension and to the air source, the body having a passageway extending between the apertures in each of the first and second ends for providing an air flow path between the fittings for providing pneumatic power to a tool coupled to the extension, the body further including switch means for controlling the flow of air through the passageway;

a sleeve for coupling a pneumatic tool to the extension for coupling the tool to the air source, the sleeve having a connecting portion slidably coupled to the body and a coupling portion for coupling a pneumatic tool to the extension, the coupling portion partially extending about a portion of the tool for coupling the tool to the extension, the sleeve adjustable along the length of the body to afford access to the fitting secured in the aperture in the second end of the body for coupling the tool to the fitting;

means for bypassing an actuation switch of the tool for enabling remote activation and deactivation of the tool with the switch means of the extension, the bypass means configured to detachably secure the tool to the coupling portion of the sleeve; and positioning means for maintaining the sleeve at different desired locations along the body and for inhibiting movement between the body and the sleeve.

7. The extension of claim 6 further comprising:

the body further comprising a connecting region that extends from the second end thereof toward the first end and a handle portion that extends from the first end of the body to the connecting region, the handle portion configured to enhance grasping of the extension, the switch means located in the handle portion to afford one-handed control of a pneumatic tool coupled to the extension;

the connecting portion of the sleeve extending about the periphery of the connecting region and in ridable communication therewith for slidably coupling the sleeve to the body for coupling the tool to the extension; and a shoulder formed about a junction of the handle portion and the connecting region for preventing the sleeve from extending over the handle portion.

8. The extension of claim 7 wherein the handle portion has a conical cross-sectional configuration to enhance grasping of the extension.

9. The extension of claim 8 wherein the handle portion has a plurality of grooves extending perpendicularly to the length of the body formed in the periphery thereof to enhance gripping of the extension.

10. The extension of claim 7 wherein the positioning means further comprise:

a spring biased retaining member disposed in the connecting region of the body at a selected location, the spring biasing the retaining member outwardly so that the member projects slightly above the periphery of the connecting region;

a plurality of holes formed through the coupling portion of the sleeve, each of the holes dimensioned complementary to the retaining member for receiving the member, the holes spatially positioned along the coupling portion of the sleeve for positioning the sleeve at different selected locations along the body's connecting region and for inhibiting movement between the body and the sleeve, the positioning means aiding alignment of the bypass means with the actuation switch of the tool for enabling remote activation and deactivation of the tool and for securing the tool to the body.

11. The extension of claim 6 wherein the bypass means comprises a pliable band member secured to a side of the connecting portion of the sleeve and a retaining means secured to another side of the connecting portion opposite to the band member, the band member dimensioned to be disposed about the actuation switch of a pneumatic tool retained in the connecting portion of the sleeve, the retaining means comprising a thumb actuated screw rotatably retained in a housing, such that the screw acts as a worm gear for adjusting the length of the band when coupled to the band member for reducing the length of the band, such that the band exerts sufficient force on the actuation switch of the tool to bias the switch into an on position for bypassing the switch.

12. The extension of claim 6 wherein the extension comprises a lightweight metal alloy.

13. The extension of claim 12 wherein the extension comprises aluminum.

14. The extension of claim 6 wherein the extension is at least six inches in length.

15. The extension of claim 14 wherein the extension ranges from approximately 6 inches to approximately 12 inches in length.

16. The extension of claim 14 wherein the extension ranges from approximately 8 inches to approximately 12 inches in length.

17. The extension of claim 6 wherein the switch means comprises a momentary push-button switch for controlling the flow of air through the passageway in the body.

18. The extension of claim 6 wherein the switch means comprises a momentary push-button switch for controlling the flow of air through the passageway in the body.

19. The extension of claim 6 wherein the aperture provided in each of the first end and second end of the body is threaded, the threaded apertures allowing attachment and removal of a predetermined one of a male and female portion of a pneumatic fitting to allow the extension to couple to complementary pneumatic fittings on each of the pneumatic tool and air source.

* * * * *